US006231938B1

United States Patent
Gockel et al.

(10) Patent No.: US 6,231,938 B1
(45) Date of Patent: May 15, 2001

(54) EXTRUDED MULTILAYER POLYMERIC SHELL HAVING TEXTURED AND MARBLED SURFACE

(75) Inventors: Gary L. Gockel; Kathy L. Pratschner, both of Vista; Steven M. Hammock, Encinitas, all of CA (US)

(73) Assignee: Watkins Manufacturing Corporation, Vista, CA (US)

( * ) Notice: Subject to any disclaimer, the term of this patent is extended or adjusted under 35 U.S.C. 154(b) by 0 days.

(21) Appl. No.: 08/087,227

(22) Filed: Jul. 2, 1993

(51) Int. Cl.[7] ............................. B32B 1/02; B32B 25/08; A47K 3/00
(52) U.S. Cl. ............................. 428/35.7; 4/493; 4/541.1; 4/507; 428/35.9; 428/147; 428/156; 428/172; 428/152; 428/213; 428/339; 428/412; 428/543; 428/522
(58) Field of Search .................... 428/35.7, 147, 428/156, 172, 152, 213, 339, 412, 543, 35.9; 4/507, 541.1, 506, 509, 493, 557

(56) References Cited

U.S. PATENT DOCUMENTS

| 4,067,071 | * | 1/1978 | Altman et al. ........................... 4/145 |
| 4,844,944 | * | 7/1989 | Graefe et al. ........................ 428/357 |
| 4,892,700 | * | 1/1990 | Guerra et al. ........................ 264/510 |

* cited by examiner

Primary Examiner—Ellis Robinson
(74) Attorney, Agent, or Firm—Myron B. Kapustij; Lloyd D. Doigan

(57) ABSTRACT

Multilayer polymeric shells for spas, bathtubs and shower enclosures having a textured and marbled surface layer. The shells are produced by forming by extrusion a multilayer polymeric sheet having a marbled appearing top layer, passing the sheet between rollers to impart a textured surface to the marbled top layer of the sheet, and thermoforming the sheets into the structural shells for spas, bathtubs and shower enclosures.

13 Claims, 1 Drawing Sheet

EXTRUDED MULTILAYER POLYMERIC SHELL HAVING TEXTURED AND MARBLED SURFACE

FIELD OF THE INVENTION

This invention relates to multilayer polymeric shells for spas, bathtubs and shower enclosures wherein the top layer is marbled and textured.

SUMMARY OF THE INVENTION

The invention relates to a multilayer polymeric shell for spas, bathtubs and shower enclosures wherein the top layer is marbled and textured. The shells are formed by first extruding a multilayer polymeric sheet and then thermoforming the sheet into the shaped shell. In the extrusion process the polymers comprising the different layers are coextruded in a single extrusion head. The marbled appearance of the top layer is achieved by utilizing two extruders for the top layer. One extruder extrudes a polymer of one color while the other extruder extrudes a polymer of different color. The two extrudates are mixed or blended until a marbleized blend is obtained. This blend is then fed to a single extrusion head and is coextruded with the polymer comprising the underlying layer. The top layer of the extruded sheet has a marbled or striped appearance. The extruded sheet is passed between rollers, with the roller which is in contact with the top layer of the multilayer polymeric extruded sheet being textured. Contact of the top layer with the textured roller imparts a textured appearance to the top layer. The extruded multilayer polymeric sheet having a marbled and textured top layer is then molded, preferably by thermoforming, into the shaped shell.

DESCRIPTION OF THE PREFERRED EMBODIMENT

Figure 1:
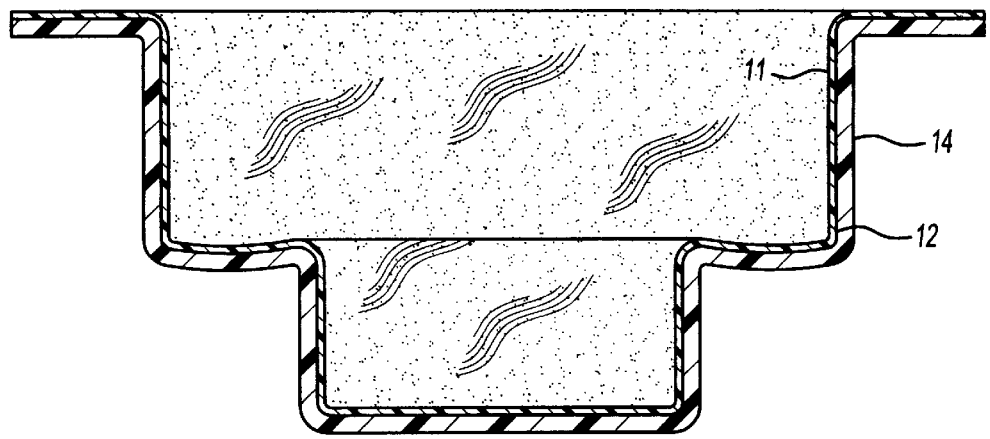
FIG. 1 is a side elevational view in cross-section of the multilayer polymeric spa shell of the instant invention.

In accordance with the present invention there is provided a molded resin shell for a spa, bath or shower enclosure. The surface of the shell is textured and marbled to improve safety and provide aesthetic appeal.

The multilayer resin shell 14 is comprised of at least two layers or plies, a top or surface layer 11 and at least one underlying or supporting layer 12 beneath the top layer. It is the top layer which is textured and marbled. The top layer and at least one underlying layer are comprised of polymeric material which is capable of being extruded and molded, preferably vacuum formed. Such a material is preferably a thermoplastic polymeric material. The shell may be comprised of the top layer and one, two or more underlying layers disposed beneath the top or surface layer. In a preferred embodiment the shell is comprised of a top layer and an underlying layer.

The resinous materials comprising the various layers are extruded, e.g., coextruded, in a conventional manner and are passed between rollers in a conventional manner to form sheets 10, and the sheets are molded, preferably thermoformed or vacuum formed in a well known and conventional manner, into the shell.

The texturing is provided to the surface layer by passing the coextruded material between at least two rollers, a bottom roller and a top roller. The top roller which comes into contact with the top layer is textured and is the calendering roller and imparts the texturing to the top or surface layer or ply of the sheet. The bottom roller is generally smooth.

The top layer is comprised of a polymeric material which generally provides protection against weathering, chemicals and the like to the underlying structural support layer. The top layer also provides additional support to the coextruded structure. The preferred polymeric materials comprising the top layer are the polyacrylates and the polycarbonates.

The terms polyacrylates or acrylic polymers are intended to mean polymers where one or more of the monomers polymerized is an acrylate or methacrylate but some non-acrylate monomers may be included and even be present in a major amount. These polyacrylates are well known in the art and are generally commercially available. Exemplary acrylic polymers are set forth, for example, in Encyclopedia of Polymer Science and Technology, Vol. 1, Interscience Publishers, John Wiley & Sons, Inc., 1964, at p. 204 et. seq., and the references cited therein, all of which are incorporated herein by reference.

The acrylic or methacrylic acid ester monomers are represented by the general formula $CH_2=CYOOR^1$ wherein Y is H or a methyl radical and $R^1$ is an alkyl radical, preferably one containing from 1 to about 20 carbon atoms.

Examples of alkyl groups represented by $R^1$ include methyl, ethyl, n-propyl, isopropyl, n-butyl, isobutyl, sec-butyl, tert-butyl, n-amyl and the various positional isomers thereof, and likewise the corresponding straight and branched chain isomers of hexyl, heptyl, octyl, nonyl, decyl and the like.

Exemplary non-limiting acrylic acid ester monomers include methyl acrylate, isopropyl acrylate, n-propyl acrylate, n-butyl acrylate, isobutyl acrylate, sec-butyl acrylate, 2-ethylhexyl acrylate, etc. Exemplary non-limiting methacrylic acid ester monomers include methyl methacrylate, ethyl methacrylate, n-butyl methacrylate, isobutyl methacrylate, hexyl methacrylate, etc. Copolymers of the above acrylic acid ester and/or methacrylic acid ester monomers are also included within the terms "polyacrylates" and "acrylic polymers" as they appear herein. The polymerization of the monomeric acrylic acid esters and methacrylic acid esters to provide the thermoplastic acrylic polymers useful in the practice of the invention may be accomplished by any of the well known and conventional polymerization techniques.

The polyacrylate compositions may optionally contain the various well known and conventional additives which function for their intended purpose. These additives include, for example, antioxidants; antistatic agents; hydrolytic stabilizers such as the epoxides; color stabilizers such as the organophosphites; colorants; ultraviolet radiation stabilizers such as the benzophenones, benzotriazoles, and cyanoacrylates; flame retardants; fillers such as talc and mica; and glass fibers.

The polycarbonates are well known in the art and are commercially available. They are described, along with methods for their preparation, in U.S. Pat. No. 3,161,615; U.S. Pat. No. 3,220,973; U.S. Pat. No. 3,312,660 and U.S. Pat. No. 4,656,225, all of which are incorporated herein by reference.

These polycarbonates contain at least the following recurring structural unit:

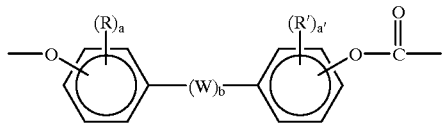

wherein:
R and R¹ are independently selected from monovalent hydrocarbon radicals, monovalent hydrocarbonoxy radicals, and halogen radicals;
W is selected from divalent hydrocarbon radicals, —S—,—O—,—S—S—,—C—,—S—,and—S—;
n and n' are independently selected from integers having a value of 0 to 4 inclusive; and
b is either zero or one.

The polycarbonate resin compositions may optionally contain the various well known and conventional additives which function for their intended purpose. These additives include, for example, antioxidants, antistatic agents, hydrolytic stabilizers such as the epoxides, color stabilizers such as the organophosphites, colorants, ultraviolet radiation stabilizers such as the benzophenones, benzotriazoles, and cyanoacrylates, flame retardants, fillers such as talc and mica, and glass fibers.

The polycarbonates may also contain a protective surface coating such as an organopolysiloxane. Polycarbonates having protective surface coatings are described in U.S. Pat. No. 3,707,397 and U.S. Pat. No. 4,224,378 (organopolysiloxanes); U.S. Pat. No. 3,843,390 (polyester-melamines or acrylic-melamines); and U.S. Pat. No. 2,332,461 (allyl resins), all of which are incorporated herein by reference.

In the preferred embodiment the bottom layer is comprised of ABS (acrylonitrile-butadiene-styrene) resin formulation. ABS resins are well known in the polymer art as a class of thermoplastics which offers excellent mechanical properties as well as good processability and chemical resistance. The general characteristics of ABS resins are described, for example, in "Modern Plastics Encyclopedia", McGraw-Hill, New York, N.Y. 1990, pp 90–91, and in U.S. Pat. No. 3,130,177, all of which are incorporated herein by reference. ABS resins are co- or terpolymers which generally comprise a rigid styrene/acrylonitrile continuous phase in combination with a polybutadiene elastomer disperse phase. A graft copolymer in which small amounts of styrene and acrylonitrile are grafted onto butadiene chains may also be present to bridge the rigid phase and the elastomer phase and make them more compatible.

For purposes of the instant invention, an ABS resin is a thermoplastic, the chemical structure of which includes each of the following structural units, however combined:

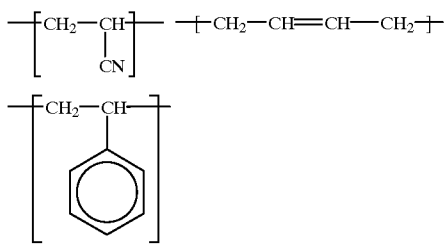

Further, a formulated ABS resin, for all purposes herein, comprises at least about 50 wt % ABS resin. The remainder of the formulated ABS resin comprises various monomeric or polymeric additives which modify the properties of the ABS resin. These additives include, for example, various impact modifiers, stabilizers, processing aids, pigments, flame retardants, synergists, etc. They can be incorporated into the ABS resin in various ways.

The ABS resin component of the formulated ABS can be selected from the many resins available in commerce. Such resins include GE Cycolac® resins, Monsanto Lustran® resins, and Dow Magnum® resins, for example. The ABS resin component of the formulated ABS resin of this invention comprises at least about 50 wt % of the formulation, and the ABS resin can comprise as much as about 70 wt % of the formulation.

Figure 2:
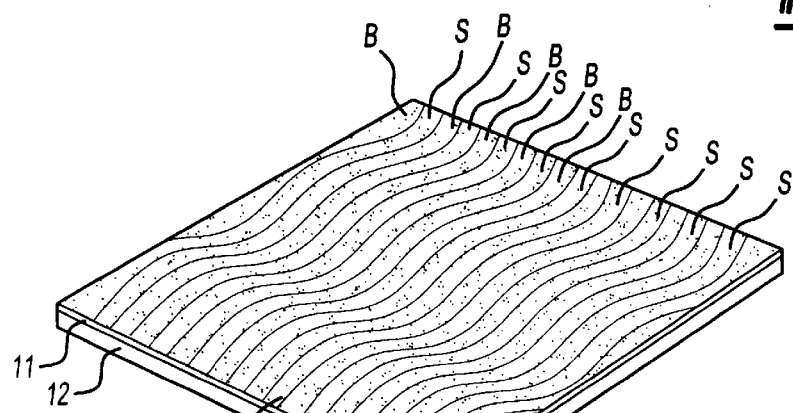
FIG. 2 is a perspective view of the multilayer polymeric sheet having a marbled and textured top layer.

As mentioned previously the top layer has a marbled appearance. By marbled is meant a streaked, striped, wavy or non-continuous coloring. For example a surface layer having a background color such as blue with streaks or stripes of a different color such as white or light blue. Such an appearance is illustrated in FIG. 2 wherein the top layer 11 of sheet 10 has a background color B with stripes or streaks S.

This appearance is achieved by using two extruders to form the top layer. One or the first extruder extrudes resin of one color (the resin pellets fed into the extruder are of a particular color such as blue), while the other or second extruder extrudes resin of a different color (the resin pellets fed into the second extruder are of a particular color which is different from those in the first extruder). The different colored resin extruded from the first and second extruder are then slightly or partially mixed or blended in a conventional mixer or blender so as to form a material which has a streaked or marbled appearance. The two resins are not fully mixed or blended because full mixing or blending results in a resin having a color intermediate the color of the two resins and does not produce streaked or striped appearance. Thus, the resins are mixed or blended an amount which is effective to produce a blend which forms an extrudate having a marbled or striped appearance.

The resinous material extruded from the first and second extruder as well as the mixed resinous material from the mixer is in a semi-molten state, e.g., it has the consistency of dough. This mixed resinous material from the mixer, together with the resinous material which forms the underlying layer and which is extruded from a third extruder, is fed into a sheet die or single extrusion head and extruded in the form of a sheet having a top layer or ply comprised of the marbled mixed resinous material from the mixer or blender, e.g., acrylic polymer, and an underlying or bottom layer or ply, e.g., ABS resin. This sheet is then passed between rollers. The rollers serve to texture the top layer, compress the sheet to gauge, and cool the sheet.

In vacuum forming of the shell the extruded sheet is generally laid in a mold, such as a female mold, of the desired shell configuration. Appropriate suction perforations are provided in the mold structure in order to draw the sheet material downwardly into the mold and thus shape the sheet into the desired overall contour or shape. The sheets, which in the preferred embodiment is comprised of a top layer of polyacrylate composition, which top layer has been marbled and textured, and a bottom layer comprised of ABS composition, is softened by appropriate heating, e.g., from about 320 to about 340 degrees F.

In a preferred embodiment the top layer generally comprises from about 10 to about 30% of the thickness of the sheet of extruded resinous material. Generally, the sheet has a thickness of from about 1/16 to about 1 inch, preferably from about 1/8 to about 3/4 inch, and more preferably from about 3/16 to about 1/2 inch.

Figure 3:
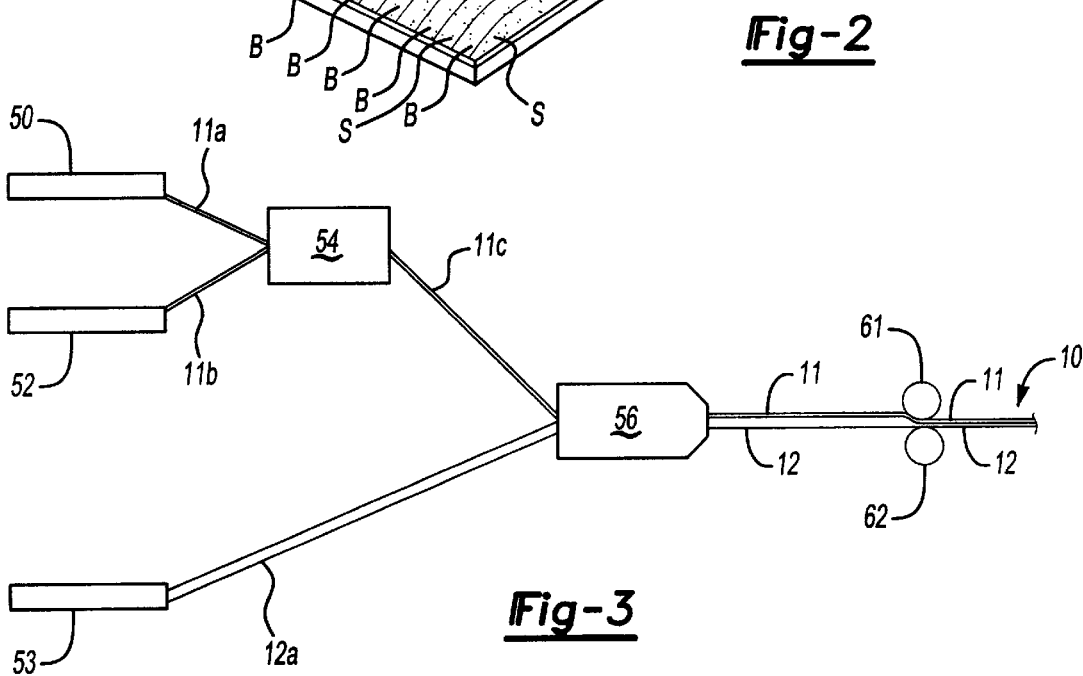
FIG. 3 is a schematic illustration of means and process for obtaining the extruded multilayer polymeric sheet having a marbled and textured top layer.

FIG. 3 illustrates, in schematic form, the method of producing the multilayer polymeric sheet 10 having a textured and marbled top layer 11. Two extruders 50, 52 and mixer 54 are utilized to form the top layer 11. Polymer, such as acrylic polymer, pellets of one color, such as blue, are fed to extruder 50 and extruded as a colored, such as blue, extrudate 11a. The extruder 50 normally operates at a temperature of from about 400° F. to about 500° F. Polymer, such as acrylic polymer, pellets of another color, such as white, are fed to extruder 52 and extruded as a colored, such as white, extrudate 11b. Extruder 52 normally operates at a temperature of from about 400° F. to about 500° F. The two streams of extrudate 11a and 11b are fed to a mixer or blender 54 where they are slightly mixed or blended. The amount of mixing or blending is an amount which is effective to produce an extrudate blend 11c which when fed to extruder 56 results in a top layer having a marbled appearance. If the two streams 11a and 11b are too thoroughly mixed the resulting extrudate blend 11c will form a sheet 11 which is of a single color, generally between the colors of streams 11a and 11c, rather than a sheet 11a having a striped or streaked appearance. The extrudate blend 11c and the extruded polymer 12a, such as ABS, extruded from extruder 53, which extrudate 12a forms the underlying layer 12 of the multilayer sheet 10, are fed into extruder 56 where they are coextruded into multilayer sheet 10 comprised of marbled top layer 11 and bottom layer 12. Extruder 53 generally operates at a temperature of about 400° F. to about 500° F. Extruder 56 generally operates at a temperature of about 400° F. to about 500° F.

The sheet 10a is then passed between rollers. Roller 61 which is textured comes into contact with marbled top layer 11 and imparts a textured appearance to top layer 11 of sheet 10. It is generally preferred that the resins forming streams 11a and 11b be the same, e.g., acrylic.

After passing through rollers 61, 62 the sheet 10 is molded, preferably thermoformed or vacuum molded, by standard and well known techniques to a shaped shell structure.

In order to more fully and clearly illustrate the present invention the following example is presented. The example is to be considered as illustrative rather than limiting the invention disclosed and claimed herein.

In the extrusion process the apparatus of FIG. 3 is used. Blue colored pellets of polyacrylate resin composition, Rohm & Haas Co.'s "DR" resin composition, are extruded from extruder 50 while white colored pellets of the same resin composition are extruded from extruder 52. Extruder 50 and 52 are operated at temperatures of about 450° F. The extrudate 11a and 11b from extruders 50 and 52 is fed to mixer 54 where it is slightly mixed to form mixed extrudate 11c. Mixed extrudate 11c is fed to the die or single extruder head 11c along with extrudate 12a from extruder 53. Extrudate 12a is comprised of an ABS resin, such as one marketed by the General Electric Company as their 3700 ABS resin. Extruder 53 is operated at a temperature of about 450° F. The single extruder head 56 is operated at a temperature of about 450° F. Extruder head 56 is suitable for extruding a sheet 10 having a thickness of about ⅝ inches and a width of about 120 inches. The sheet 11 is then passed between rollers and a textured roller comes into contact with surface layer 11 to provide texturing thereto. The rollers are at a temperature of about 350° F.

Sheet 10 having a marbled and textured top layer 11 is then thermoformed into a shell. This is accomplished by securing the sheet into a clamping frame with the textured and marbled side up. The sheet is then moved into an oven where it is heated to about 325° F. to 350° F. using top and bottom heaters. She sheet sags as it is heated. The heated sheet is transported to the forming station where it is lined up with the mold. The heated sheet is then pulled into the mold with vacuum. The formed shell is cooled on the mold for about eight minutes and is then removed from the mold and trimmed.

The embodiments presented here are provided for the purposes of illustration and are not intended in any way to limit the breadth of the claims as set forth below.

What is claimed is:

1. A multilayer polymeric shaped structural shell having a top layer of acrylic resin composition or polycarbonate resin composition which is striped in appearance and is textured and an ABS composition underlying layer obtained by extruding a first acrylic or polycarbonate resin composition of a first color to form a first extrudate, extruding a second acrylic or polycarbonate resin composition of a second color to form a second extrudate, mixing said first extrudate and said second extrudate in a manner effective to form a mixed extrudate having a striped appearance, coextruding said mixed extrudate and a third ABS composition to form a sheet comprised of a top layer comprised of said mixed extrudate and having a striped appearance, and at least one underlying layer of said third composition, passing said sheet between at least two rollers, with the roller in contact with said top layer being textured to impart texturing to said top layer, and thermoforming said sheet into a structural shell having a striped and textured top layer.

2. The shell of claim 1 wherein said first resin composition is acrylic resin composition.

3. The shell of claim 2 wherein said acrylic resin is a thermoplastic acrylic resin.

4. The shell of claim 2 wherein said second resin composition is acrylic resin composition.

5. The shell of claim 4 wherein said acrylic resin is a thermoplastic acrylic resin.

6. The shell of claim 4 wherein said third resin composition is comprised of ABS resin.

7. The shell of claim 1 wherein said first resin composition is polycarbonate resin composition.

8. The shell of claim 7 wherein said second resin composition is polycarbonate resin composition.

9. The shell of claim 1 wherein said first and second colors are different.

10. The shell of claim 9 wherein said second color is white.

11. The shell of claim 10 wherein said first color is selected from the group consisting of blue-green, grey, dark grey and blue.

12. The shell of claim 10 wherein said marbled appearance comprises a blue background having light blue stripes.

13. The shell of claim 1 which is a spa shell.

* * * * *